United States Patent [19]

Trevor

[11] Patent Number: 4,458,736
[45] Date of Patent: Jul. 10, 1984

[54] COPYING ROUTING MACHINE

[76] Inventor: Terence A. Trevor, 33 Victoria St., Balmoral, Brisbane, Queensland, Australia, 4171

[21] Appl. No.: 233,586

[22] PCT Filed: Jun. 10, 1980

[86] PCT No.: PCT/AU80/00021
§ 371 Date: Jan. 28, 1981
§ 102(e) Date: Jan. 28, 1981

[87] PCT Pub. No.: WO80/02814
PCT Pub. Date: Dec. 24, 1980

[30] Foreign Application Priority Data

Jun. 11, 1979 [AU] Australia ............................... PD9144
Jan. 17, 1980 [AU] Australia ............................... PE2040

[51] Int. Cl.³ ........................... B23Q 35/10; B27C 5/06
[52] U.S. Cl. .................................. 144/144 A; 108/92; 108/96; 409/110
[58] Field of Search ................... 409/93, 97, 110, 124, 409/86, 130, 137; 269/254 CS; 144/144 R, 144 A, 144.5 R, 134 C, 134 D; 51/34 A, 50 PC; 125/11 PT; 108/92, 96, 98, 99, 101

[56] References Cited

U.S. PATENT DOCUMENTS

| | | | |
|---|---|---|---|
| 682,883 | 9/1901 | Neudermann | 269/254 CS X |
| 1,440,184 | 12/1922 | Stenger | 409/93 |
| 1,587,181 | 6/1926 | Pomeroy et al. | 269/254 CS |
| 2,068,228 | 1/1937 | Dinsmore | 269/254 CS |
| 2,261,644 | 11/1941 | Cockrell | 409/86 X |
| 2,576,699 | 11/1951 | Schabot | 409/86 X |
| 2,678,497 | 5/1954 | Dodson | 409/93 X |
| 2,729,892 | 1/1956 | Gruettner | 409/86 X |
| 2,949,947 | 8/1960 | Story | 269/254 CS X |
| 3,068,821 | 12/1962 | Hermanns | 108/96 |
| 3,426,644 | 2/1969 | Pecchioli | 409/86 |
| 3,587,388 | 6/1971 | Muehlenweb | 409/86 |
| 3,614,910 | 10/1971 | Berlant | 409/130 |
| 3,640,231 | 2/1972 | Lenz | 409/93 X |
| 3,830,136 | 8/1974 | Sprenger | 409/86 |
| 3,880,047 | 4/1975 | Dosier | 409/137 X |
| 4,353,399 | 10/1982 | Harris | 144/144 R X |

FOREIGN PATENT DOCUMENTS 426248 3/1971 Australia .
1219260 1/1971 United Kingdom .
1336534 11/1973 United Kingdom .

Primary Examiner—Francis S. Husar
Assistant Examiner—Steven B. Katz
Attorney, Agent, or Firm—Schwartz, Jeffery, Schwaab, Mack, Blumenthal & Koch

[57] ABSTRACT

The routing machine includes a template having a surface with indicia inscribed thereon which is mounted on a template supporting surface. A link member interconnects the template surface to a workpiece surface. The link member includes a router for engaging the workpiece surface and a follower to engage the indicia of the template surface. A pivotal attachment is made to the template surface such that the link member can be pivoted relative thereto. The link member further includes a mounting frame such that the link member is movable in an upward or downward direction relative to the frame to enable the workpiece to be at different heights relative to the template surface.

8 Claims, 20 Drawing Figures

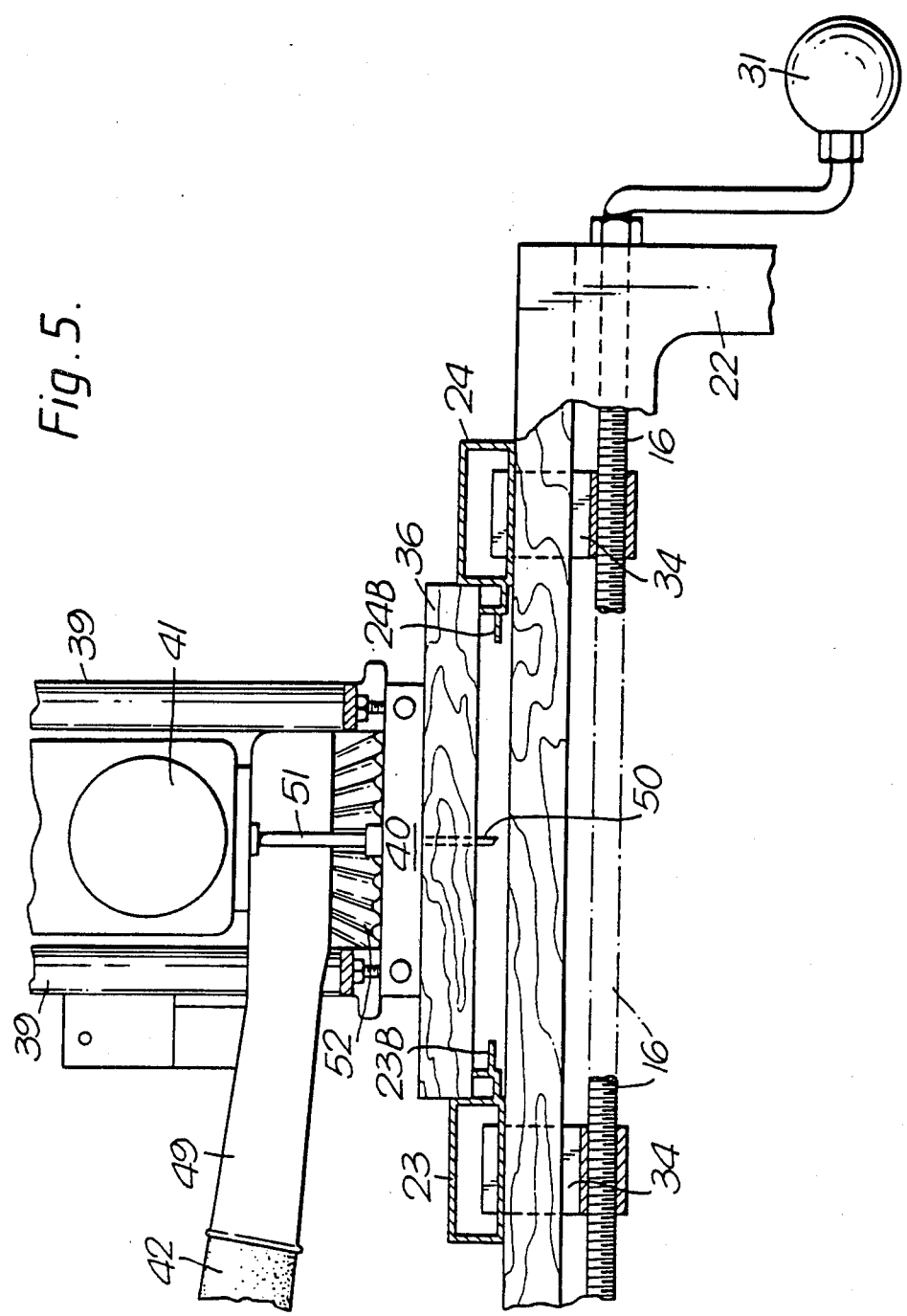

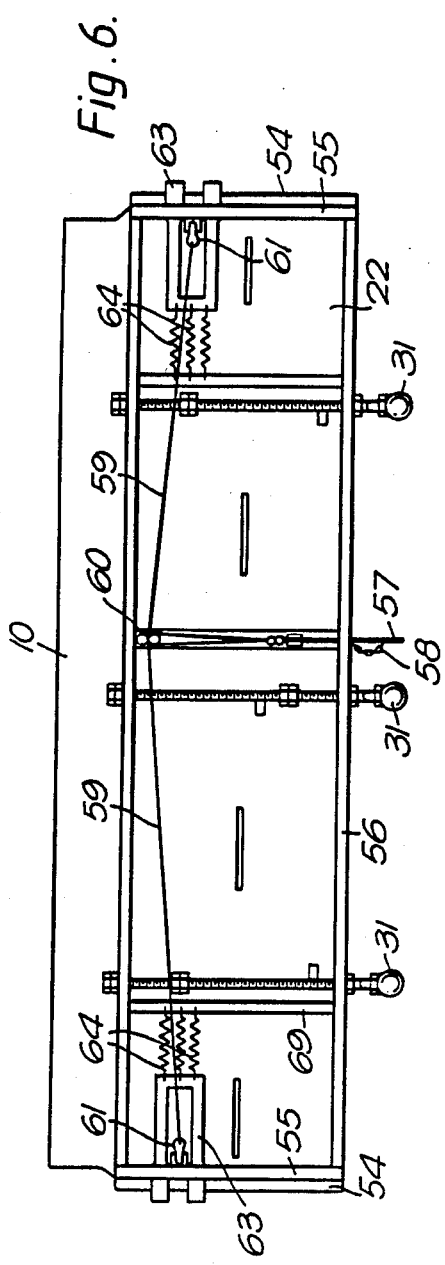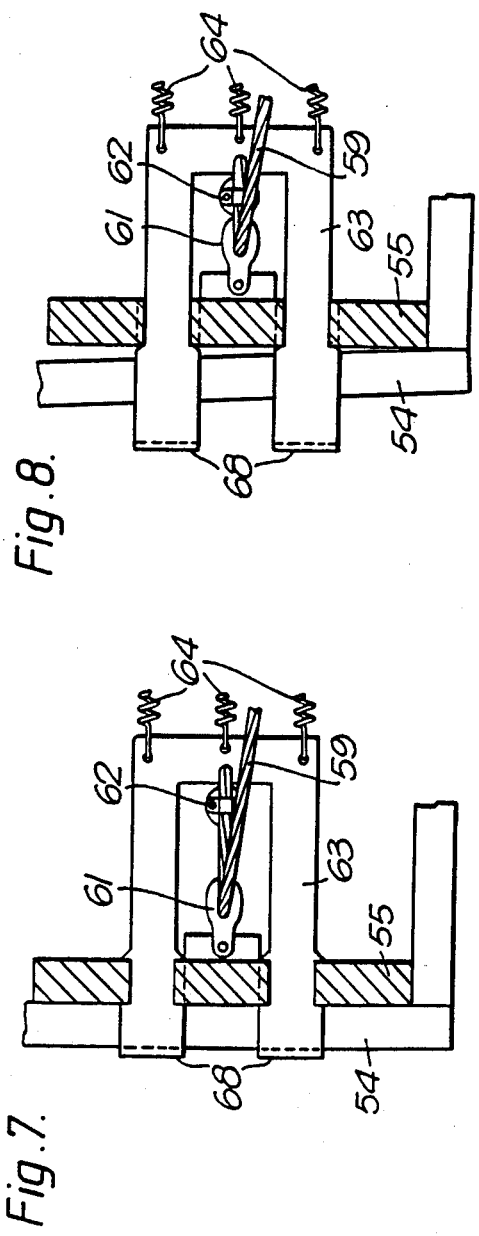

COPYING ROUTING MACHINE

BACKGROUND OF THE INVENTION

This invention relates to an improved sign routing machine.

Sign routing machines are used for transferring characters from a template surface to a workpiece surface. A typical sign routing machine is described in Australian Pat. No. 426,248 wherein a link arm is used to transfer the characters from the template surface to the workpiece surface. The link arm has a pivot point around which it is adapted to rotate in the plane of the workpiece surface, means for engaging the characters on the template surface and also means for treating the workpiece so as to inscribe the desired characters thereon.

This particular machine is somewhat limited in its operation because the template surface was essentially on the same plane as the workpiece surface. This also meant that the workpiece usually had to be elevated to the height of the template surface and this was relatively difficult if the workpiece was heavy or cumbersome.

SUMMARY OF THE INVENTION

It is an object of the invention to provide a sign routing machine which alleviates the abovementioned disadvantages associated with the prior art.

The sign routing machine of the invention includes:
a template shaving a surface with indicia inscribed or otherwise formed thereon;
template supporting means;
a link member interconnecting the template surface to a workpiece surface having:
(i) routing means for engaging the workpiece surface;
(ii) means for engaging the indicia of the template surface;
(iii) and pivotal attachment means to said template surface whereby said link member may be pivoted relative thereto and a mounting frame for said link member whereby the link member is movable in an upward or downward direction relative to said frame so as to treat the workpiece surface at a plurality of different heights relative to the template surface.

The template may comprise the top surface of a bench or table. Preferably however the template is an elongate sheet or board having indicia formed on the top surface thereof which is secured to a bench or table which constitutes a preferred template supporting means. Suitable retaining means may be provided for this purpose.

In one form there may be provided a rear mounting strip which is movable in guide tracks located at each end of the template table. In this embodiment the rear strip may be resiliently attached to the table such as by springs which are attached to the rear strip and also to the table. The rear strip when attached to the table in this manner when moved rearwardly is urged towards the front of the table.

There also may be provided a release arm for releasing the template when required. This may comprise a lever attached to the front of the table which engages with a turnbuckle under the table which in turn is attached to a cable which passes underneath the table and then through a slot in the table on the rear side of the rear mounting strip to engage with said strip. Upon actuation of the lever at the front of the table the operator may readily adjust the location of the template when required by turning the lever which by the action of the cable pulls the rear mounting strip rearwardly against the bias of the retaining springs to release the template.

The table may also include an elongate groove which may suitably be located in the front mounting strip. The front mounting strip may be omitted if required and replaced by an elongate track which is fixed to the table. The track may have a lateral extension which extends beyond one side of the template table.

The link member may have a top end section which is conveniently a triangular frame with one corner of the frame having a locating pin which extends downwardly therefrom to engage with the grooves formed by the indicia on the template. This constitutes one example of a suitable means for engaging with the indicia of the template. Another corner of the frame may have a pivot pin extending downwardly therefrom which engages with the abovementioned elongate groove. This arrangement constitutes one example of the aforesaid pivotal attachment means. Another corner of the frame may have a securing bracket or other suitable attachment member which engages with the mounting frame for the link member. Suitably the securing bracket extends downwardly from the frame when in use and is U-shaped with the base of the U including two spaced holes which are aligned with another two spaced holes provided in the corner of the frame.

The mounting frame for the link member may be of any suitable type and is suitably two spaced uprights having one or more cross members for rigidity and strength. Each upright may be supported on a base plate. The two uprights may pass through the two pairs of holes described above to suitably support the triangular frame. The triangular frame may be retained in any desired position on the mounting frame in any suitable manner.

The routing means is suitably any appropriate tool and may be a high speed hand operated electric router motor having a cutting shaft which cuts the required indicia into the workpiece surface.

The router motor may be supported on the abovementioned mounting frame although this is not essential. To accommodate the electric motor the mounting frame may be provided with a suitable support base.

There also may be provided a vacuum pump for drawing away any sawdust or other debris created by the action of the cutting tool. This is useful in preventing sawdust or other debris from clogging the grooves in the workpiece surface and hindering the cutting of the grooves. Suitably a vacuum hose is attached to the mounting frame so as to achieve this function which then connects with any appropriate vacuum source such as a pump or vacuum and suction cleaner. There also may be provided a shroud or skirt made of rubber or other resilient material which is interposed between the router motor and the support base which is attached to the vaccum hose for trapping all of the sawdust.

There also may be included supporting means for the workpiece although this is not necessary and the routing machine of the invention may be utilized to inscribe characters on logs or planks which lie on the ground.

Again the workpiece supporting means may include a table or bench. Preferably the table or bench is slidably attached to the template table and this may be accomplished in any suitable manner. It is also preferable for the workpiece table to be foldable if desired. Suitably the workpiece table may include a rear mounting strip and a front mounting strip to support the workpiece if it is a sheet or board. Preferably both mounting strips are attached to the workpiece table in a similar manner as described above for both mounting strips attached to the template table.

There also may be provided means for moving the table top relative to the support frame. This is desirable in that it enables the table top to be released from the support frame when desired, to allow workpieces of varying sizes and dimensions to be placed on the table top for subsequent processing by the sign routing machine and also it provides for fine adjustment or movement of the workpiece when secured to the table top relative to the router motor.

In one form of accomplishing this there may be provided clamps which attach the table top to the support frame which are releasable when required. In one arrangement there may be provided a pair of opposed end clamps which are attached by springs to the underside of respective ends of the support frame. Each clamp may be constituted by a U-shaped member with the base of the U attached to the support frame by the aforesaid springs. The arms of the U may pass through opposed apertures in the adjacent ends of the support frame and table top. There may be provided a pulley rigidly attached to the support frame through which an actuating cable passes. The cable is rigidly attached to the base of the U.

Each actuating cable from each end of the support frame may be engageable with a centrally located double pulley located on the underside of the support frame with each cable engaging a respective pulley thereof. Each cable may then be merged into a single which is attached to a release lever. Upon actuation of the release lever each cable is tensioned and thereby causes each clamp to move outwardly from the support frame, thereby releasing the table top.

There also may be provided reduction means for reducing the size of the indicia on the workpiece surface relative to the template surface. This may be constituted by an extendable arm being attached to the triangular frame as referred to above with the arm on its outer free end including a template pin which engages the template surface. The arm is preferably L-shaped with the pin being attached to the base of the L. There may be provided a series of co-aligned holes on the arm as well as the corresponding portion of the triangular frame whereby the distance of the free end of the arm from the frame may be varied. Using the above-mentioned extension arm it is found that because the template pin has a greater distance to travel when attached to the extension arm than the router cutting shaft indicia having reduced vertical dimensions may be produced.

BRIEF DESCRIPTION OF THE DRAWINGS

Reference is now made to a preferred embodiment of the invention as shown in the accompanying drawings wherein:

FIG. 5 is a detailed view of the mounting of the link member to the workpiece table;

FIG. 6 is a bottom plan view of the workpiece table;

FIG. 7 is a detailed view of one end clamp clamping the workpiece tabletop to the support frame in the clamped position;

FIG. 8 is a detailed view similar to that shown in FIG. 7 showing the released position;

DETAILED DESCRIPTION OF THE PREFERRED EMBODIMENT

Figure 1:
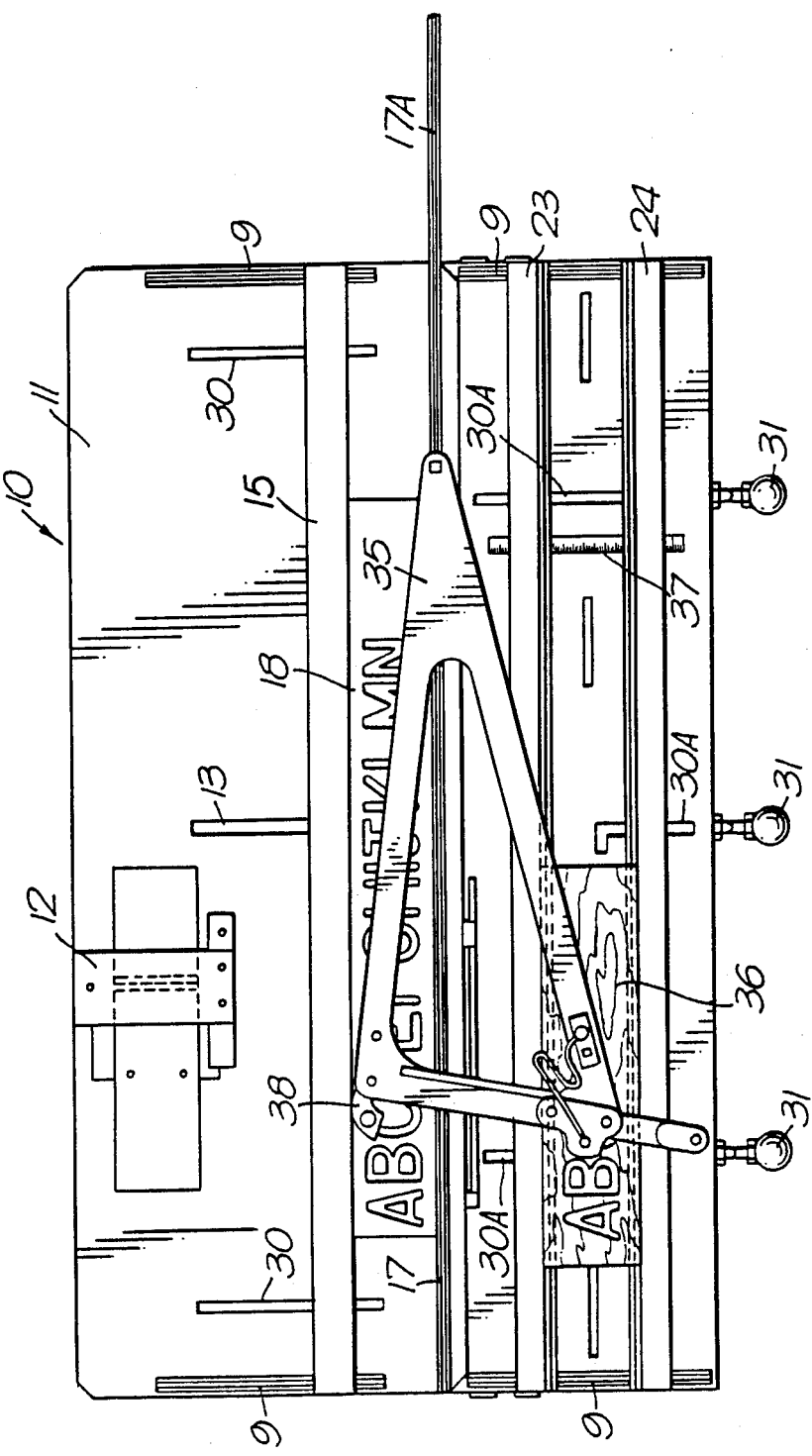
FIG. 1 is a top plan view of a router machine constructed in accordance with the invention.

In the drawings there is shown template table 10, top surface 11, recess for machine plane 12 (used when the workpiece has had the desired symbols cut into it and is subsequently painted with the top surface thereafter being planed leaving the painted symbols untouched), rear mounting strip 15, elongate groove 17 having lateral extension 17A and template board 18.

Figure 3:
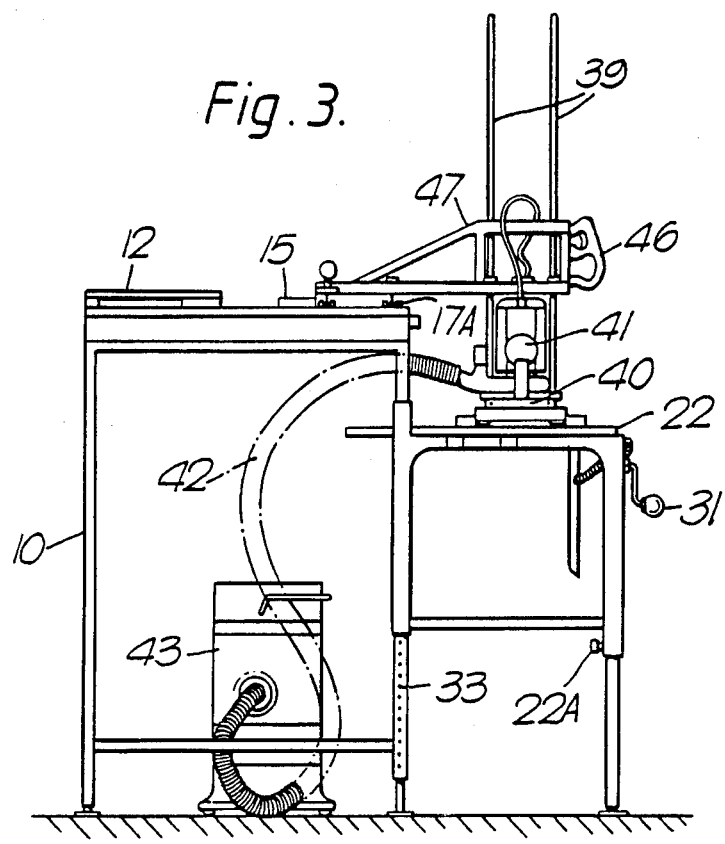
FIG. 3 is an end view of the machine shown in FIG. 2.

The front workpiece table 22 includes rear mounting strip 23, front mounting strip 24, winder handles 31, cut outs or slots 30A, springs (not shown) resiliently attaching rear mounting strip 23 to table 22, and leg 32 telescopically received in guide sleve 32A and adjustment holes 33 for regulating the height of table 22 with a locking pin 22a insertable therethrough. This latter feature is best shown in FIG. 3.

Rear mounting strip 23 and front mounting strip 24 can be moved closer together or further apart so as to allow for the different sizes of the workpiece board. This is accomplished by rotation of winder handles 31 wherein shaft 16 meshes with traveller nut 34 attached to strips 23 and 24. Nut 34 is free to move in cut outs 30A in the table 22. Locking nuts (not shown) attach the shafts 16 to the table 22. This is best shown in FIG. 5. The central winder is for the front strip 24 while the end winders are for the rear strip 23.

Figure 12:
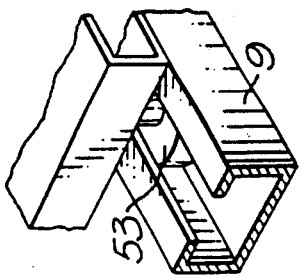
FIG. 12 is a detailed view of the mounting strips for the workpiece and their attachment to their respective guide tracks.

In FIG. 1 there is further shown the template board 18 mounted between the rear mounting strip 15 which is movable in guide tracks 9. FIG. 12 shows the actual mounting of strip 15 in track 9. There is also shown triangular frame 35, workpiece board 36, sunken ruler 37 and extension arm 38.

Figure 2:
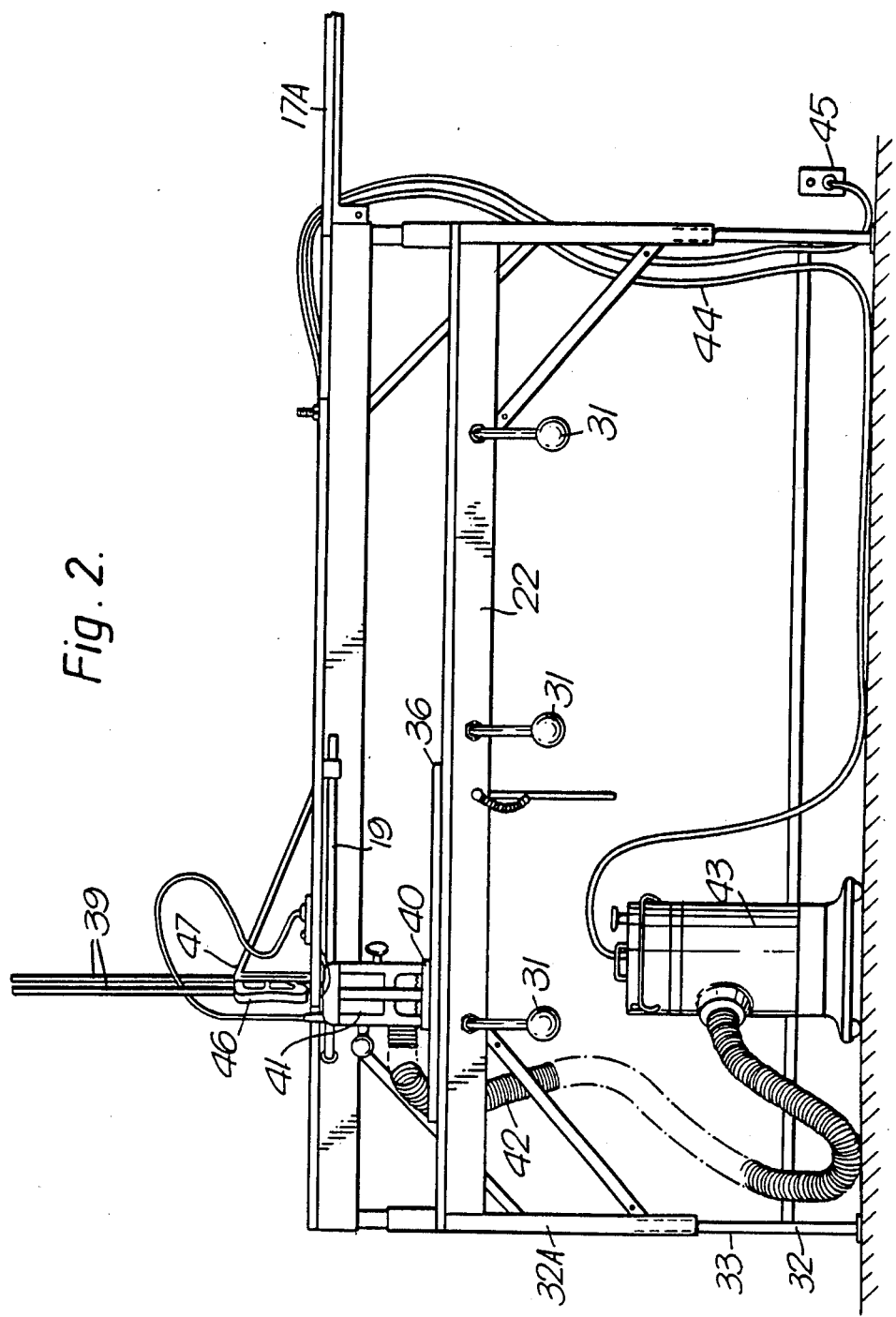
FIG. 2 is a side view of the machine shown in FIG. 1.

In FIG. 2 there is shown the mounting frame comprising uprights 39 and support base 40. Router motor 41 and vacuum hose 42 to vacuum cleaner 43 is shown together with leads 44 to switch 45.

Figure 4:
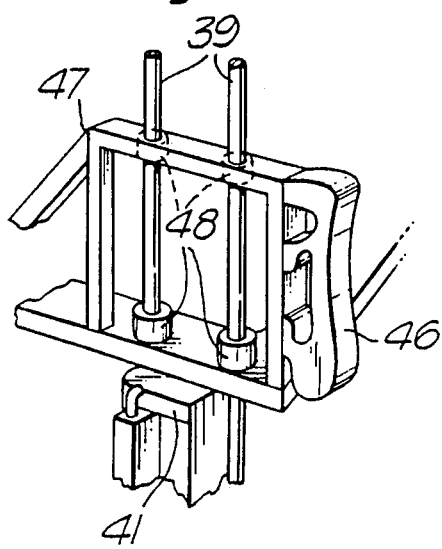
FIG. 4 is a detailed view of the switching mechanism for the router.

In FIGS. 3 and 4, there is shown a handle for the router motor 41 and securing bracket 47 for attachment of triangular frame 35 to upright 39. Bracket 47 is integral with frame 35. Bracket 47 is freely movable along uprights 39 as shown by the provision of guide sleeves 48 which may be in the form of locknuts to retain bracket 47 in a desired vertical position.

In FIG. 5 there is shown router motor 41 and its attachment to uprights 39 and base 40 of the mounting frame. Cutting shaft 50 of motor 41 is housed in guide 51. The workpiece 36 is shown mounted on a front mounting strip 24 and a rear mounting strip 23 and is thus clear of the top surface of table top 22. Three positions of adjustment, i.e. as shown in FIG. 5 on the top surface of strips 23 and 24, and on retaining strips 23B and 24B are shown. There is also shown shroud 49 which is attached to vacuum hose 42. Shroud 49 has attached thereto a rubber skirt 52 so as to ensure all dust particles are removed from the region of cutting shaft 50 and thus pass into vacuum hose 42. Strips 23 and 24 are mounted in guide tracks 9 on table top 22 as shown in FIG. 12 where is provided travelling pins 53 which travel along guide tracks 9.

Figure 9:
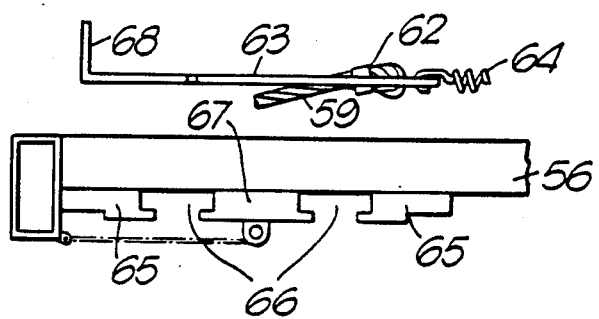
FIG. 9 is an alternative view of the different components clamping mechanism shown in FIGS. 7 and 8.

In FIG. 6 there is shown the underside of workpiece table 22 which has end flanges 54 engaging with end flanges 55 of support frame 56 which includes legs 32 shown previously. Cables 59 are shown attached to U-shaped clamps 63 shown in side view in FIG. 9 and in plan in FIG. 7 (closed position) and FIG. 8 (open position). Clamps 63 are attached by springs 64 to supports 69 of support frame 56. Each cable 59 passes through a pulley 61 attached to flanges 55 of support frame 56. Each clamp 63 has an anchor 62 which engages the outer ends of cable 59. Each cable 59 as shown in FIG. 6 is attached to release arm 57 via pulley assembly 60. Arm 57 is held by chain 58 to support frame 56. In FIG. 9 there are shown apertures 66 through which the U-shaped clamps pass before clamping flanges 54 of table top 22. End lugs 65 and intermediate lug 67 are provided to form apertures 66. Each clamp 63 has a retaining part 68 which engages with flanges 54 as shown in FIG. 6.

Upon actuation of release arm 57, cables 59 are tensioned and thereby allow for outward movement of clamps 63 by virtue of relaxation of springs 64 and thus free table top 22 from support frame 56.

Figure 10:
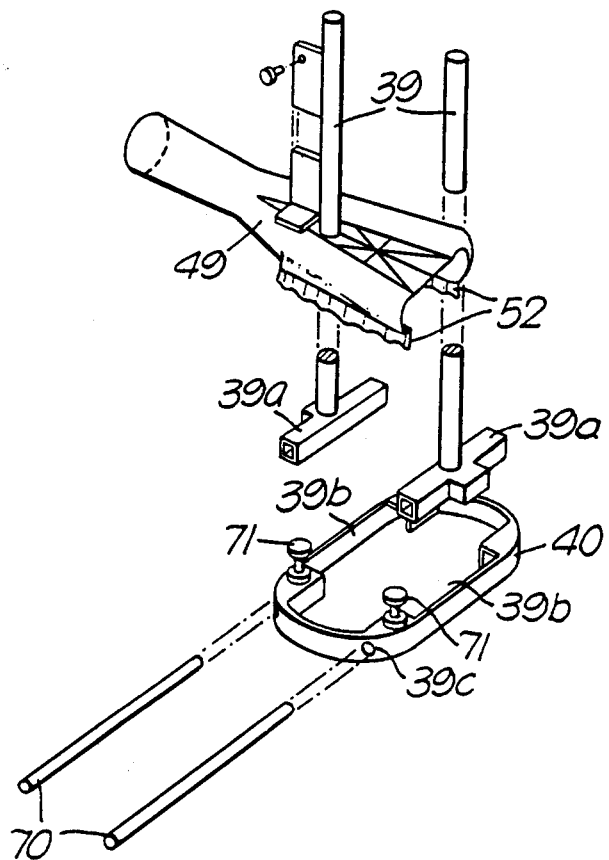
FIG. 10 is a perspective view of the mounting frame and base support.

In FIG. 10 the base of the mounting frame for router motor 41 is shown. Each upright 39 has a transverse bar 39a at its lower end which engages in slots 39b shown in base 40. Rods 70 pass through apertures 39c and are retained in position by screws 71 to secure parts 39a to base 40 and thus support router 41.

Figure 11:
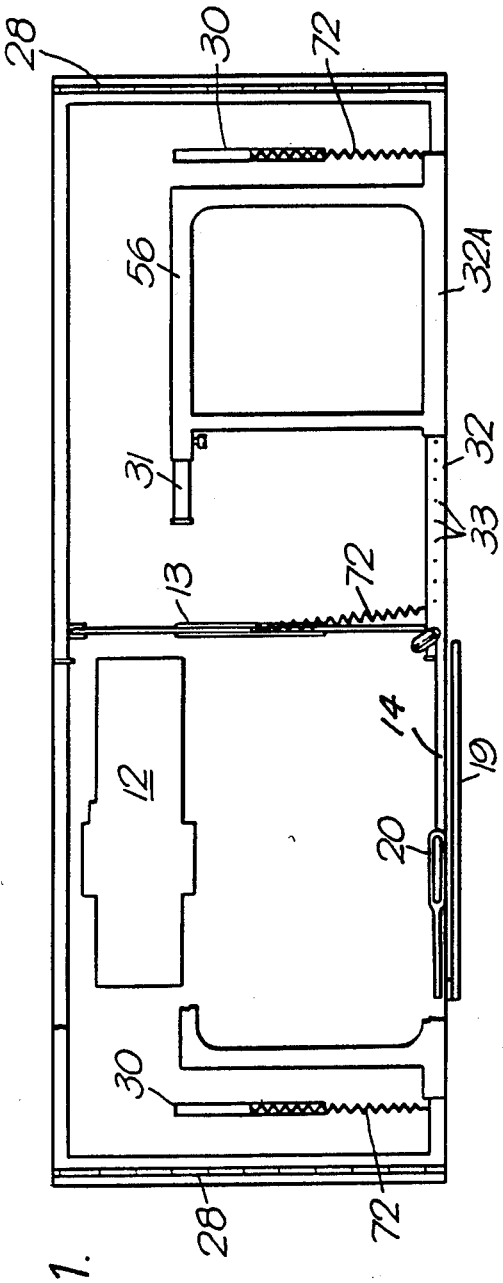
FIG. 11 is a view of the machine of FIG. 6 showing the workpiece table folded underneath the template table.

FIG. 11 shows the machine in a dis-assembled state with table top 22 removed and support frame 56 folded underneath. The template table 10 also has hinges 28 to allow folding of legs 32 underneath the table 10 as shown. Springs 72 are also included for the rear mounting strip 15 for template 18. The release mechanism for the rear mounting strip 15 includes release arm 19, turnbuckle 20, cable 14, and springs 72. Actuation of release arm 19 allows for removal of template board 18 when desired. Each spring 72 engages with rear mounting strip 15 through the two end slots 30 and the central cable slot 13.

Figure 13:
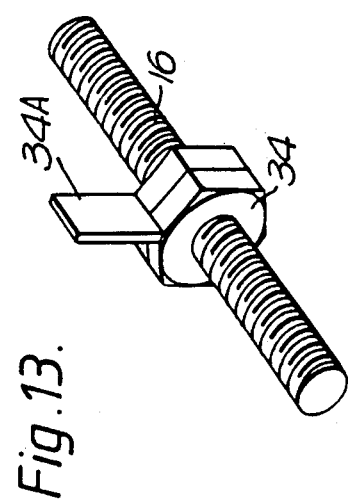
FIG. 13 is a detailed view of the winder shaft and its attachment to the traveller nut.

FIG. 13 shows the attachment of traveller nut 34 to winder shaft 16 which has an upper tab 34a which travels in cut outs 30A previously described.

Figure 14:
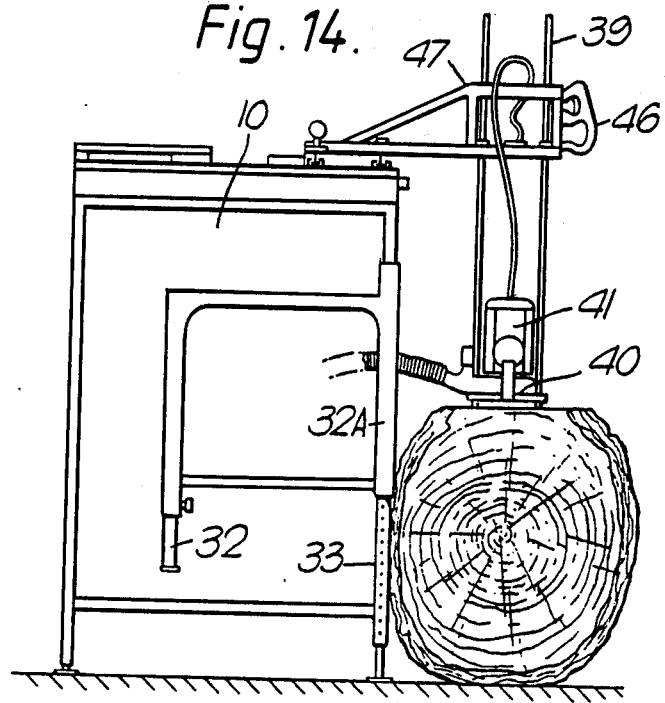
FIG. 14 is a view similar to FIG. 16 showing the routing machine of the invention in operation without the workpiece table.

FIG. 14 shows the router machine carving indicia on a log which is used as the workpiece with table top 22 removed and the support frame 56 pivoted around and underneath template table 10.

Figure 15:
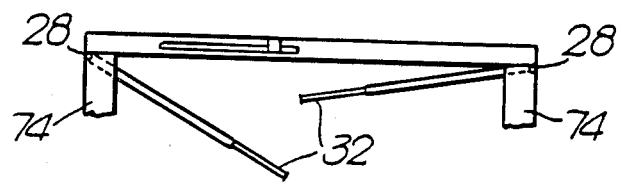
FIG. 15 is a view showing the router machine in a completely folded position.

FIG. 15 shows the folding up of legs 32 underneath template table 10 along hinges 28 and illustrating that the entire assembly in folded condition may be supported by supports 74 only a minimal distance from the ground and still satisfactorily operate on a workpiece. This illustrates the versatility of the routing machine.

Figure 16:
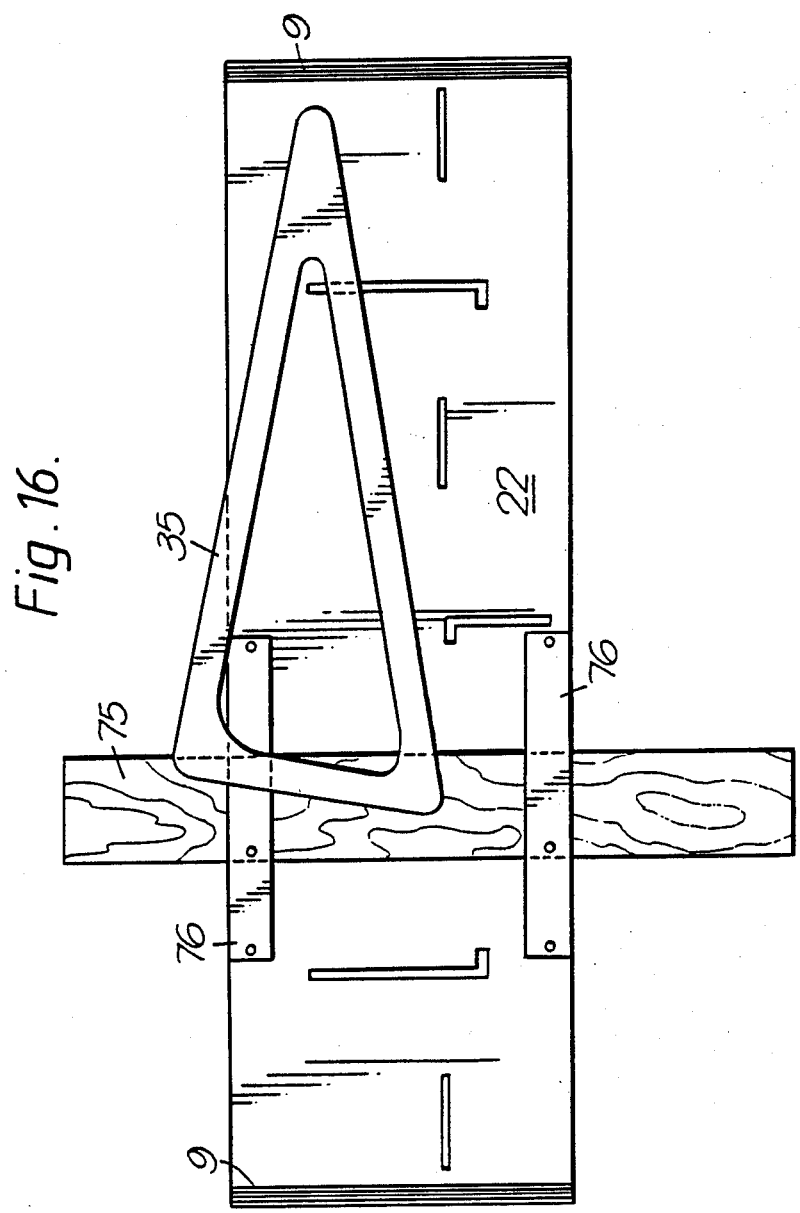
FIG. 16 is a view showing a workpiece being fixed to the workpiece table which is at right angles to the template table.

FIG. 16 shows the versatility of the machine again wherein a workpiece 75 is fed across the table top 22 and wherein indicia are carved vertically down workpiece 75. Auxiliary securing strips 76 are secured to table 22 and workpiece 75 passes underneath securing strips 76.

Figure 17:
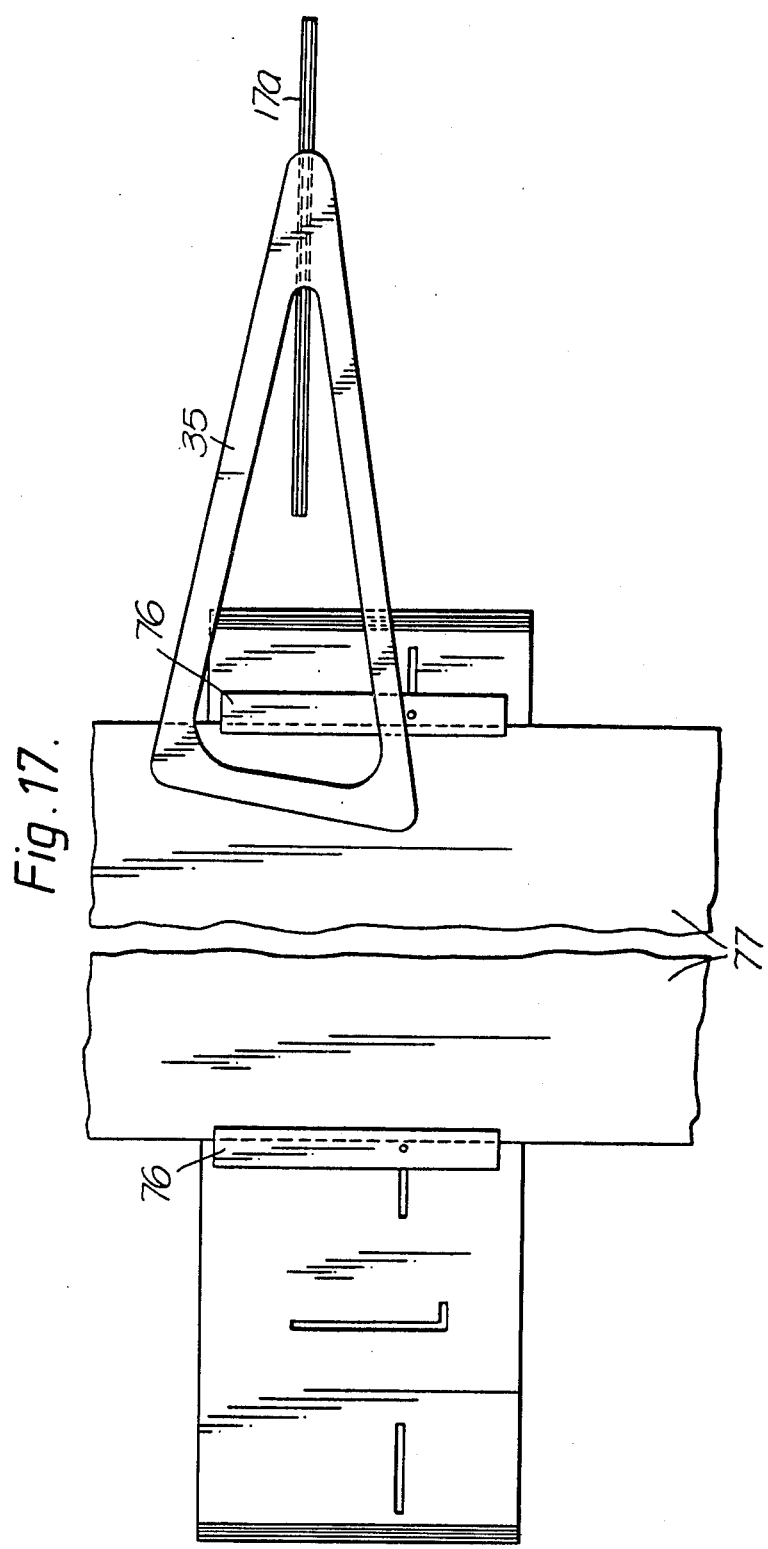
FIG. 17 is a view similar to that of FIG. 16 showing the routing machine being applied to a narrow workpiece strip.

FIG. 17 shows instead of a narrow workpiece 75 a sheet 77 having indicia carved thereon by frame 35 wherein the frame can move across and then vertically down workpiece 77. This figure also shows why it is useful to have the lateral extension of guide track 17a.

Figure 18:
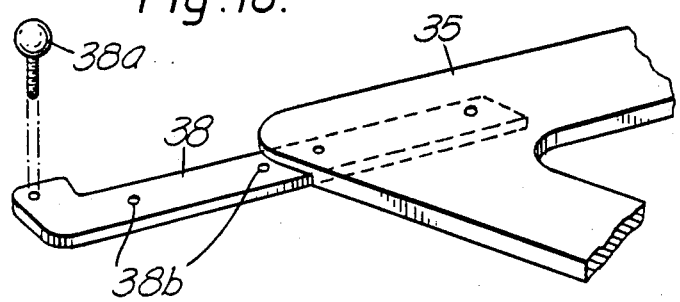
FIGS. 18 and 19 are detailed views of the traingular frame and extension arm and FIG. 20 shows the engagement of the frame to the guide track on the template table.
Figure 19:
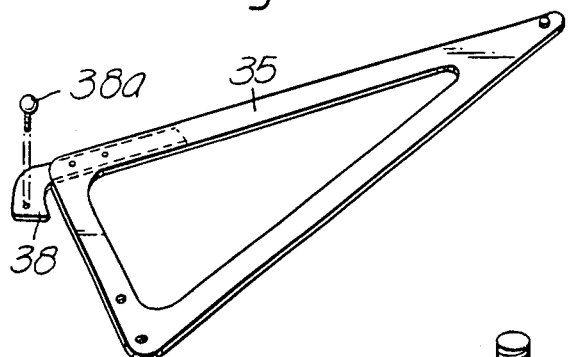
Figure 20:
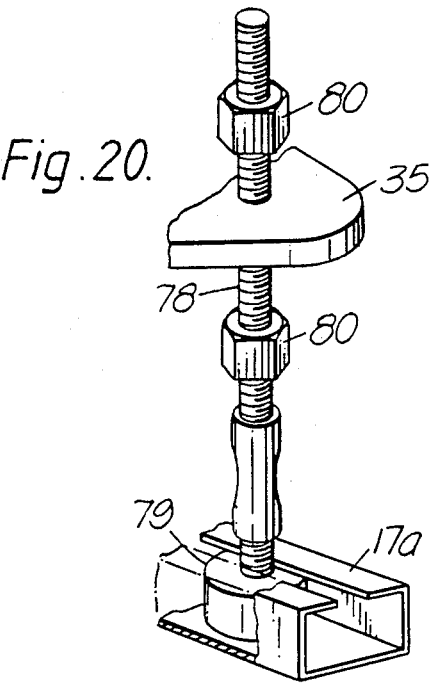

FIG. 18 shows frame 35 having extension arm 38 and locating pin 38a which engages in the indicia of template board 18. There are also included an array of spaced holes 38b for attachment of arm 38 to frame 35. FIGS. 19 and 20 show also pin 78 which engages in track 17a by the use of base runner 79. Frame 35 is pivotable to pin 78 as shown. Nuts 80 are also shown for attachment of threaded pin 78 to frame 35.

I claim:
1. A sign routing machine for performing operations on a workpiece including:
  a template having a surface with indicia formed thereon;
  means for supporting said template;
  a link member having means for engaging the indicia on said template surface;
  pivotal attachment means for pivotally connecting said link member to said template supporting means;
  a mounting frame;
  means for releasably connecting said mounting frame to said link member such that said mounting frame and said link member can move vertically relative to one another;
  router means connected to said mounting frame for forming indicia on said workpiece; and
  a workpiece table to support said workpiece adjacent said template supporting means, said workpiece table including:
    means for releasably attaching said template supporting means to said workpiece table to enable said template supporting means and said workpiece table to be separated; a supporting frame; a workpiece table top; and means for releasably attaching said workpiece table top to said supporting frame, wherein said means for releasably attaching said workpiece table top to said supporting frame comprises a plurality of spring loaded clamps with each clamp being movable from a closed position wherein the workpiece table top is rigidly attached to the supporting frame to a released position wherein said workpiece table top is movable relative to the supporting frame.

2. A sign routing machine as claimed in claim 1, wherein said template comprises an elongate sheet and said template supporting means is a table having a top surface, said elongate sheet being located on said top surface and wherein said machine further includes retaining means for releasably holding said template to said top surface.

3. A sign routing machine as claimed in claim 2, wherein said retaining means includes a release arm attached to said table, a rear mounting strip for engaging said elongate sheet, spring means for biasing said rear mounting strip in a first direction, and a cable connecting said release arm to said rear mounting strip.

4. A sign routing machine as claimed in claim 1, wherein the link member includes an upper section which has a rigid frame, said rigid frame having a pivot pin which extends downwardly, a track mounted on said template supporting means, said track including a groove formed therein to receive and guide said pivot pin, said rigid frame also incorporating a locating pin which extends downwardly therefrom to engage said indicia on the template, said rigid frame being rigidly attached to the mounting frame during operation of the sign routing machine and including means for releasing said mounting frame for removing said rigid frame.

5. A sign routing machine as claimed in claim 4, wherein the routing means is a router motor having a cutting shaft which cuts indicia into the workpiece surface, and means for releasably supporting said router on the mounting frame below said rigid frame.

6. A sign routing machine as claimed in claim 5 and further including vacuum pump means for removal of debris created by the action of the cutting shaft of the router motor, said vacuum pump means having a vacuum hose attached to the mounting frame with a surrounding shroud which is interposed between the router motor and the mounting frame so as to effectively trap said debris for discharge through said vacuum hose.

7. A sign routing machine as claimed in claim 1 and further including actuating means for actuating movement of each spring loaded clamp, said actuating means including an actuating cable attached to each clamp, a centrally located pulley wheel connected to each actuating cable, a release lever, and a single cable connecting said pulley wheel to said release lever.

8. A sign routing machine as claimed in claim 1 and further including reduction means for reducing the size of the indicia on the workpiece relative to the indicia on the template, said reduction means including an extendable arm which is releasably and adjustably attached to the rigid frame, said extendable arm having a template pin on an outer free end thereof which engages with the template indicia.

* * * * *